US008856822B2

(12) United States Patent
Ahn et al.

(10) Patent No.: US 8,856,822 B2
(45) Date of Patent: Oct. 7, 2014

(54) METHOD FOR INSERTING CONTENTS SEARCHED FROM STORAGE OF A HOST AND APPARATUS THEREOF

(75) Inventors: Sung-Wook Ahn, Seoul (KR); Kwang-Hyuk Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 685 days.

(21) Appl. No.: 12/741,459

(22) PCT Filed: Mar. 26, 2008

(86) PCT No.: PCT/KR2008/001673
§ 371 (c)(1),
(2), (4) Date: May 5, 2010

(87) PCT Pub. No.: WO2009/061037
PCT Pub. Date: May 14, 2009

(65) Prior Publication Data

US 2010/0251286 A1 Sep. 30, 2010

Related U.S. Application Data

(60) Provisional application No. 60/985,324, filed on Nov. 5, 2007.

(30) Foreign Application Priority Data

Feb. 28, 2008 (KR) ........................ 10-2008-0018519

(51) Int. Cl.
*H04N 7/10* (2006.01)
*H04H 20/10* (2008.01)
*H04H 20/40* (2008.01)
*H04H 20/93* (2008.01)

(52) U.S. Cl.
CPC ............. *H04H 20/106* (2013.01); *H04H 20/93* (2013.01); *H04H 20/40* (2013.01)
USPC ............................................... 725/32; 725/36

(58) Field of Classification Search
USPC ...................................................... 725/32, 36
See application file for complete search history.

(56) References Cited

U.S. PATENT DOCUMENTS

2002/0083439 A1 6/2002 Eldering
2002/0100043 A1* 7/2002 Lowthert et al. ................ 725/32

(Continued)

FOREIGN PATENT DOCUMENTS

EP 0751640 A2 2/1997
KR 1020010110055 A 12/2001

(Continued)

OTHER PUBLICATIONS

Communication dated Nov. 30, 2011 from the European Patent Office in counterpart European application No. 08723709.5.

(Continued)

*Primary Examiner* — Pankaj Kumar
*Assistant Examiner* — Charles N Hicks
(74) *Attorney, Agent, or Firm* — Sughrue Mion, PLLC

(57) ABSTRACT

Provided are a method and apparatus for inserting second contents stored in a storage medium of a host while first contents input from an external provider are played includes: searching, by a searching unit, for the second contents using location information which indicates a location of the second contents stored in the storage medium; detecting, by a signal information detecting unit, signaling information from the first contents, the signaling information indicating a section in the first contents in which insertion of the second contents is allowed; and playing, by a playing unit, the searched, second contents in the allowed section of the first contents which are being played, based on the signaling information.

11 Claims, 2 Drawing Sheets

(56) References Cited

U.S. PATENT DOCUMENTS

| | | | | |
|---|---|---|---|---|
| 2003/0174837 | A1 | 9/2003 | Candelore et al. | |
| 2003/0195901 | A1 | 10/2003 | Shin et al. | |
| 2005/0015816 | A1* | 1/2005 | Christofalo et al. | 725/136 |
| 2007/0055983 | A1* | 3/2007 | Schiller et al. | 725/32 |
| 2007/0101360 | A1 | 5/2007 | Gutta et al. | |
| 2007/0140318 | A1 | 6/2007 | Hellman | |
| 2007/0162927 | A1* | 7/2007 | Ramaswamy et al. | 725/36 |

FOREIGN PATENT DOCUMENTS

| | | | |
|---|---|---|---|
| KR | 10-2003-0067988 | A | 8/2003 |
| KR | 1020060116820 | A | 11/2006 |
| WO | WO 2006097825 | A2 | 9/2006 |

OTHER PUBLICATIONS

Communication dated Apr. 27, 2012 from the Korean Intellectual Property Office in counterpart Korean application No. 10-2008-0018519.

Communication dated May 16, 2012 from the Canadian Intellectual Property Office in counterpart Canadian application No. 2,704,844.

* cited by examiner

METHOD FOR INSERTING CONTENTS SEARCHED FROM STORAGE OF A HOST AND APPARATUS THEREOF

CROSS-REFERENCE TO RELATED APPLICATION

This application is a national-stage entry of PCT/KR2008/001673, filed Mar. 26, 2008. The application claims the benefit of U.S. Provisional Application No. 60/985,324, filed Nov. 5, 2008 and claims priority from Korean Patent Application No. 10-2008-0018519, filed on Feb. 28, 2008 in the Korean Intellectual Property Office, the disclosure of which is incorporated herein by reference.

BACKGROUND

1. Field

Exemplary embodiments relate to a method and an apparatus for inserting contents, and more particularly, to a method and an apparatus for inserting specific advertisement streams that are stored in a host during a specific advertisement (AD) break in contents streams input from a headend device.

2. Description of the Related Art

A client-based digital program insertion (DPI) function allows a multi system operator (MSO) to designate an application such as a target engine, etc., disposed at a client, such as a set top box, so that a specific advertisement can be displayed during an advertisement (AD) break in the middle of a running program and also allows a client device to switch streams of the running program to streams of another specific advertisement by using a channel switch function.

By using the client-based DPI function, an MSO may allow a client device (not a headend device such as a relay) to perform an operation of inserting a desired advertisement and may provide a specialized advertisement to a user by providing a function of selecting a desired, specific advertisement stream from several advertisement streams provided to the application disposed at the client device.

In order to increase the effect of a specialized advertisement to the user, data relating to a user's preferences may be investigated when a user selects a specific advertisement stream. The user's preferences may be investigated by using a metric technique (for example, multiple regression) or a nonmetric technique (for example, LINMAP, MONANOVA, PREEFMAP, Johnson's nonmetric algorithm, etc.).

Advertisement streams are transmitted in real-time in the form of another program of another channel or the same channel in the format of an MPEG-2 transport stream (TS).

FIG. 1 illustrates a related art system for inserting contents in a live stream by using channel switch.

Referring to FIG. 1, the system for inserting contents in a live stream by using channel switch comprises a headend device 110 and a host 120. The headend device 110 of an MSO transmits data 111 including DPI signaling and contents (including advertisement streams) to a host 120 in a TS form. In addition, the headend device 110 operates a target engine 122 which is a kind of an application 121 in the host 120 by using a command and control. The target engine 122 performs an advertisement inserting operation by using a switch engine (SE) 123-1 of an OpenCable Application Platform (OCAP) 123, which is a middleware standard for the host 120.

When a specific advertisement stream that is being transmitted in real-time is switched and inserted, a DPI operation may be performed using a DPI trigger method or a DPI timeline method. The DPI operation performed by using a DPI trigger method will now be described as follows.

First, a DPI signaling descriptor of a DPI signaling (i.e., DPI signaling description and DPI trigger) is transmitted from the headend device 110 to notify that the DPI operation will be performed on a currently-viewed channel.

Next, the target engine 122 generates a switch instruction object including channel information on which an insertion advertisement will be loaded and a switch identifier (ID), and transfers the switch instruction object to a switch engine 123-1.

Upon receiving the switch instruction object, the switch engine 123-1 parses information of the switch instruction object and prepares to perform switching.

When a time for inserting a specific advertisement comes, the headend device 110 transfers a DPI trigger to the host 120.

In the host 120, a switch ID of the switch instruction object is compared with a synchronized_event_id of the DPI trigger when the DPI trigger is received. When the switch ID of the switch instruction object is the same as the synchronized_event_id of the DPI trigger, the system performs the DPI operation by switching a viewing channel by using channel information of an insertion advertisement of the switch instruction object.

On the other hand, when the switch ID of the switch instruction object is different from the synchronized_event_id of the DPI trigger, the system regards this state as a malfunction, and informs the target engine 122 of the malfunction.

FIG. 2 illustrates a related art method of inserting contents in a live stream by using channel switch.

Referring to FIG. 2, as an example, a currently-viewing channel is referred to as Ch 1, wherein Ch 1 comprises a general program broadcasting 210 and an advertisement (AD) break 220.

Channels 133, 134, and 135 comprise insertion advertisements which are classified according to user's taste. For example, Ch 133 may be a car advertisement, Ch 134 may be a fashion advertisement, and Ch 135 may be an infant goods advertisement, etc.

Regarding Ch 1, when there are two spots such as an AD spot 1(221) and an AD spot 2(222) in the AD break 220, a corresponding section may be switched to Addressible AD 1 and Addressible AD 2 of Ch 133 by using channel switch, as illustrated in FIG. 1. Thus, for example, users who are interested in cars may be exposed more frequently to a specialized advertisement in this way.

When advertisement streams have been already stored in a storage medium of a host, i.e., in order to switch a live stream to the advertisement streams stored in the storage medium of the host without using channel switch, location information of a corresponding specific advertisement stream is parsed without performing a channel switch operation, and when a DPI trigger is received, the corresponding advertisement stream must be played.

However, in this case, a specific advertisement stream must be selected from a plurality of advertisement streams stored in the storage medium at an advertisement insertion time and must be switched. However, since there is no method of selecting an advertisement stream from the storage medium in order to be inserted, switching cannot be performed.

In addition, when there is no storage medium, advertisement streams are transmitted in a TS form, as described previously, and javax.t.locator.Locator, which is used to designate services in the TS form of Java Application Program Interface (API), may be used. However, when there is a storage medium available, and advertisement streams stored in the storage medium are used, the advertisement streams stored in the storage medium are not in the form of a TS and thus, javax.tv.locator.Locator cannot be used.

In the related art, because technology related to a standard document about location information on advertisement streams of a storage medium does not exist, specific advertisement contents cannot be designated and inserted by using a storage medium which may be a key function of DPI, and a multi system operation (MSO) cannot designate and insert video/audio components in desired contents.

SUMMARY

In the method and the apparatus for inserting contents according to the exemplary embodiments, a plurality of advertisement streams are stored in the storage medium and a specific advertisement stream designated by an application can be selectively played. Furthermore, specific video/audio components that constitute contents for advertisement can be designated and played. As a result, the exemplary embodiments can be used in relation to advertisement operations of the MSO by maximizing the exposure effect of advertisements that are most interesting to a user.

Exemplary embodiments provide a method and apparatus for inserting a designated, specific advertisement stream to be played, which is searched from advertisement streams stored in a storage medium of a host, so as to play the advertisement stream in an AD break when advertisement streams stored in the storage medium of the host are used.

According to an aspect of the exemplary embodiments, there is provided a method of inserting second contents stored in a storage medium of a host while first contents input from an external provider are being played, the method including: searching, by a searching unit, for the second contents by using location information which indicates a location of the second contents stored in the storage medium; detecting, by a signal detecting unit, signaling information from the first contents, the signaling information indicating a section in the first contents in which insertion of the second contents is allowed; and playing, by a playing unit, the searched, second contents in the allowed section of the first contents which are being played, based on the signaling information.

The location information may be in a form of a uniform resource locator (URL) and may include a protocol having an information exchange form that can be interpreted by the host, and a storage path of the storage medium of the host in which the second contents are stored.

The location information may further include an identifier (ID) of an audio or a video component provided to the second contents.

When a plurality of component IDs exists, the location information may be in a form in which the plurality of component IDs are combined, or in an array form in which the plurality of component IDs are arranged.

When a plurality of component IDs exists, the location information may designate at least one of the plurality of components.

The searching for the second contents may use an OpenCable Application Platform (OCAP) digital program insertion (DPI) function.

The signaling information may include at least one selected from the group consisting of a DPI signaling descriptor, a DPI trigger, and a DPI timeline.

The playing of the searched, second contents in the allowed section of the first contents which are being played may include playing at least one or more components designated in the location information.

According to another aspect of the exemplary embodiments, there is provided an apparatus for inserting second contents stored in a storage medium of a host while first contents input from an external provider are being played, the apparatus including: a searching unit which searches for the second contents by using location information indicating a location of the second contents stored in the storage medium; a signaling information detecting unit which detects signaling information from the first contents which indicates a section in which insertion of the second contents is allowed; and a playing unit which plays the searched, second contents in the allowed section of the first contents which are being played based, on the signaling information.

The location information may be in a form of a uniform resource locator (URL) and may include a protocol having an information exchange form that can be interpreted by the host, and a storage path of the storage medium of the host in which the second contents are stored.

The location information may further include an identifier (ID) of an audio or a video component provided to the second contents.

When a plurality of component IDs exists, the location information may be in a form in which the plurality of component IDs are combined, or in an array form in which the plurality of component IDs are arranged.

When a plurality of component IDs exists, the location information may designate at least one of the plurality of components.

The searching unit searching for the second contents may use an OpenCable Application Platform (OCAP) digital program insertion (DPI) function.

The signaling information may include at least one selected from the group consisting of a DPI signaling descriptor, a DPI trigger, and a DPI timeline.

The playing unit may play at least one or more components designated in the location information.

According to another aspect of the exemplary embodiments, there is provided a tangible, non-transitory computer readable recording medium storing executable instructions that when executed cause a computer to perform a method of inserting second contents stored in a storage medium of a host while first contents input from an external provider are being played, the method including: searching, by a searching unit, for the second contents using location information which indicates a location of the second contents stored in the storage medium; detecting, by a signal information detecting unit, signaling information from the first contents, the signaling information indicating a section in the first contents in which insertion of the second contents is allowed; and playing, by a playing unit, the searched, second contents in the allowed section of the first contents which are being played, based on the signaling information.

According to another aspect of the exemplary embodiments, there is provided a method of searching second contents to be inserted from a storage medium of a host while first contents input from an external provider are played, the method including searching, by a searching unit, for the second contents by using contents location information which includes a protocol having an information exchange form that can be interpreted by the host, and a storage path of the storage medium of the host in which the second contents are stored.

According to another aspect of the exemplary embodiments, there is provided an apparatus for searching second contents to be inserted from a storage medium of a host while first contents input from an external provider are played, the apparatus including: a searching unit which searches for the second contents using contents location information comprising a protocol having an information exchange form that can be interpreted by the host, and a storage path of the storage medium of the host in which the second contents are stored.

DETAILED DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

The attached drawings for illustrating exemplary embodiments are referred to in order to gain a sufficient understanding of the exemplary embodiments, the merits thereof, and the objectives accomplished by the implementation of the exemplary embodiments.

Hereinafter, the exemplary embodiments will be described in detail by explaining the exemplary embodiments with reference to the attached drawings.

Hereinafter, a method and an apparatus for inserting an advertisement stream to be played, which is searched from advertisement streams stored in a storage medium, will be described for a case of a client device comprising a storage medium which performs digital program insertion (DPI). The client devices may be, for example, a personal video recorder (PVR) or a digital video recorder (DVR)

Figure 3:
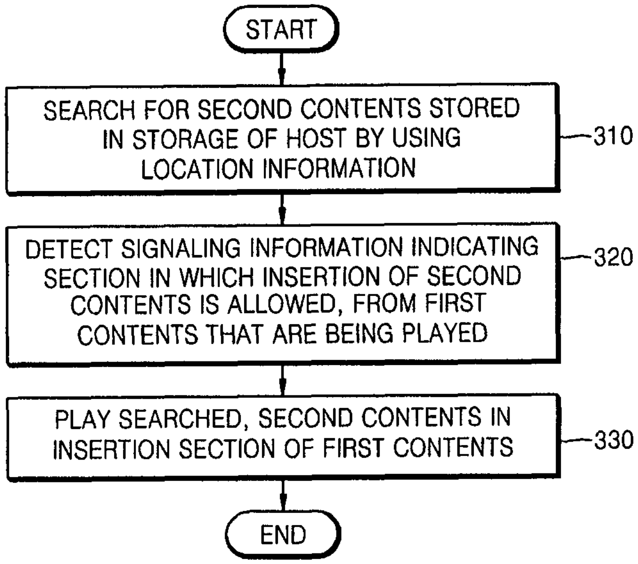
FIG. 3 is a flowchart illustrating a method of selecting contents from a storage medium of a host and inserting the contents, according to an exemplary embodiment.

FIG. 3 is a flowchart illustrating a method of selecting contents from a storage medium of a host and inserting the contents, according to an exemplary embodiment of the present invention.

Referring to FIG. 3, the method of selecting contents from the storage medium of the host and inserting the contents according to the current exemplary embodiment is a method of inserting second contents, such as specific advertisement streams stored in the storage medium of the host, in first contents, while the first contents (including DPI signaling) input from an external provider are being played. The method of FIG. 3 comprises searching for the second contents by using location information indicating the location of the second contents stored in the storage medium (operation 310), detecting signaling information indicating a section of the first contents in which insertion of the second contents is allowed (operation 320), and playing the searched, second contents in the section of the first contents that are being played based on the signaling information (operation 330).

Figure 1:
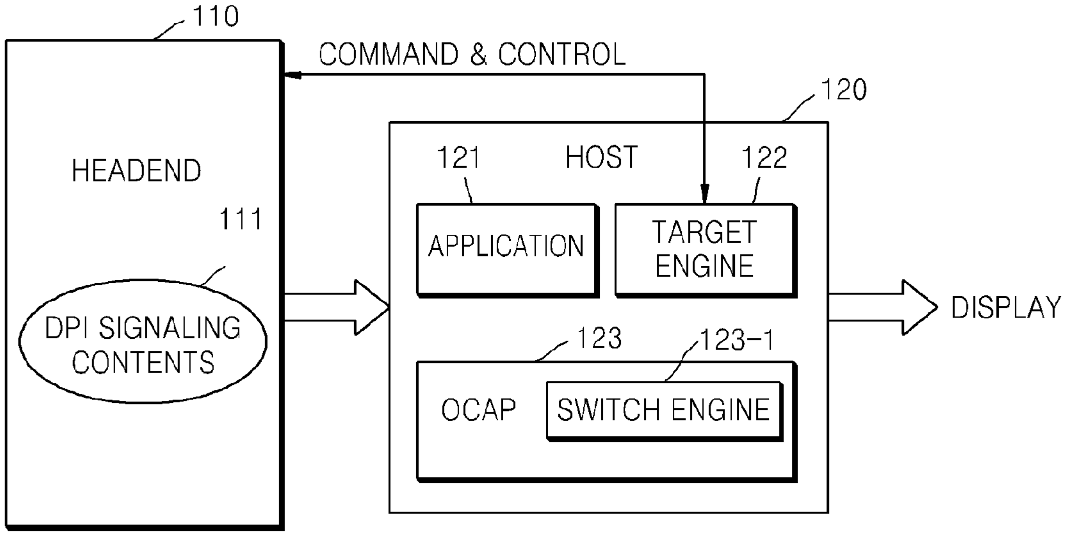
FIG. 1 (RELATED ART)
FIG. 1 illustrates a related art system for inserting contents in a live stream by using channel switch.
Figure 2:
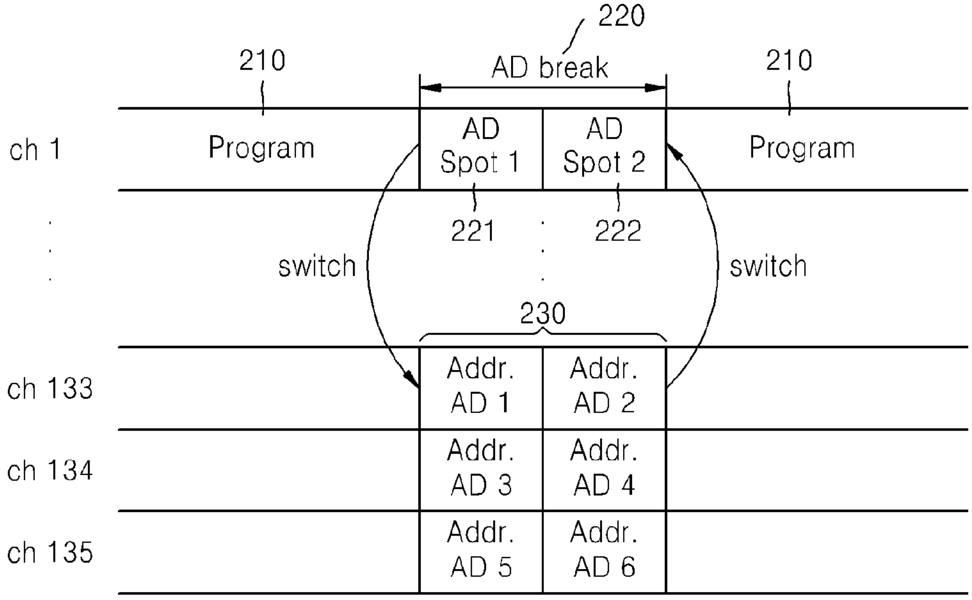
FIG. 2 (RELATED ART)
FIG. 2 illustrates a related art method of inserting contents in a live stream by using channel switch.

Advertisement streams that will be later used to perform a DPI operation using the storage medium must be stored in the storage medium in advance. Referring to the host 120 of FIG. 1, the target engine 122 or another application 121 may store advertisement streams in the storage medium by using a Java DVR Application Program Interface (API).

In addition, in operation 310, location information is used as meta data for searching for the second contents (e.g. advertisement streams) stored in the storage medium. In a related art method of designating contents by using TV Locator provided by a DPI standard, physical channel information, program number, etc., are used in a live stream and thus they cannot be used to designate the location of contents stored in the storage medium. Thus, the exemplary embodiment provides a method of designating contents stored in the storage medium by defining location information such as MediaLocator.

MediaLocator, which is a uniform resource locator (URL) form, comprises a protocol and a media path of media and is indicated in the form of "protocol://media_path".

The protocol is a rule of an information exchange form that can be interpreted by a platform processing the protocol and may be extended in various shapes. For example, the protocol may be a well-known protocol such as file:// or a platform-dependent protocol such as "dvr://" or "rec://", which is understood by a platform.

The location information may further comprise an identifier (ID) of an audio or video component provided to the second contents in view of the relationship between a service and a component. When a plurality of component IDs exist, the plurality of component IDs may be indicated in a form in which the plurality of component IDs are combined, or in an array form in which the plurality of component IDs are arranged. Described in more detail later, a component, for example, "component_id1," may be a specific advertisement video file, "component_id2" may be an English audio file, and "component_id3" may be a Spanish audio file.

Regarding second contents having a plurality of components, a method of selecting components may be provided as follows.

When only MediaLocator is referred to, the second contents may have the form of "protocol://media_path: component_id1+component_id2+component_id3"

When an array form is referred to, the second contents may have the form of "MediaLocator[0]==protocol://media_path1:component_id1", "MediaLocator[1]==protocol://media_path1:component_id2".

Thus, when a plurality of component IDs exist, the location information MediaLocator may designate at least one or more of the plurality of components.

According to the exemplary embodiment, an application of a host may store a plurality of advertisement streams to be inserted by using a Java DVR API and may designate and play a desired audio/video component in corresponding contents stored as in the following (a)-(c) items:

(a)

Advertisement stream 1: protocol://media_path1:101+102+103 (b)

Advertisement stream 2: protocol://media_path2:201+202+203 (c)

Advertisement stream 3: protocol://media_path3:301+302+303

A target engine of an application generates an advertisement stream (for example, it is assumed that an advertisement stream 2 is to be inserted at this time) from advertisement streams stored in a storage medium before an AD break starts, as an object, which is called switch instruction. The target engine sets location information in a URL form such as "protocol://media_path2:component_id1+component_id2" and transfers the location information to a switch engine through an OpenCable Application Platform (OCAP) digital program insertion (DPI) API.

Before the AD break starts, DPI signaling comprising a DPI signaling descriptor and a DPI trigger are input, and the switch engine parses "protocol://media_path2:component_id1+component_id2", which is an advertisement stream member variable in the switch instruction object. A corresponding advertisement stream 2 stored in the storage medium is searched for and played so that switching to the advertisement stream 2 is performed and as such, the advertisement stream 2, which includes second contents, is inserted in the AD break of first contents.

For example, when a transport steam (TS) which is called "service2.ts" in a path "Program Files/downloads" of the storage medium is inserted and elementary streams (ES) having program identifiers (PIDs) such as 201, 202, and 203 need to be played, a protocol of MediaLocator may be indicated in the form "dvr://" or "file://", and media_path may be indicated in the form of "Program Files/downloads/service2.ts". Thus, the program of MediaLocator may be indicated in the form of "dvr://ProgramFiles/downloads/service2.ts:201+202+203".

When the program of MediaLocator is indicated in the form of "dvr://Program Files/downloads/service2.ts:201+203" among the above examples, the elementary streams (ES) having PIDs such as 201 (e.g. a car advertisement video stream) and 203 (e.g. a Spanish audio stream) are played so that only the designated ES can be selected from advertisement streams stored and can be inserted.

Figure 4:
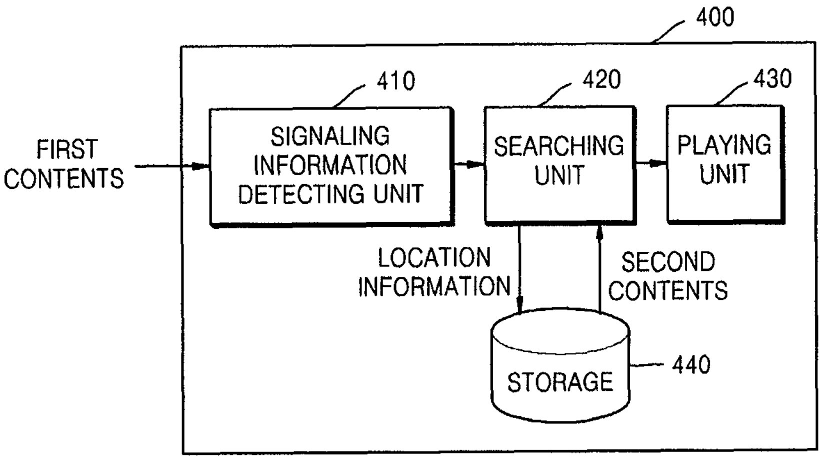
FIG. 4 is a functional block diagram illustrating an apparatus for selecting contents from a storage medium of a host and inserting the contents, according to an exemplary embodiment.

FIG. 4 is a functional block diagram of an apparatus for selecting contents from a storage medium of a host and inserting the contents, according to an exemplary embodiment.

Referring to FIG. 4, the apparatus for selecting contents from the storage medium of the host and inserting the contents according to the current exemplary embodiment inserts second contents such as specific advertisement streams stored in a storage medium 440 of the host in first contents while the first contents input from an external provider are being played, and comprises a signaling information detecting unit 410 which detects signaling information indicating a section of the first contents in which insertion of the second contents is allowed, a searching unit 420 which searches the second contents by using location information indicating the location of the second contents stored in the storage medium 440 of the host, and a playing unit 430 which plays the searched, second contents in the section of the first contents that are being played based on the signaling information that is detected by the signaling information detecting unit 410.

According to the exemplary embodiment, in the case of a PVR or DVR, advertisement streams are stored in a storage medium 440 and then, during insertion advertisement, i.e., during switching, the advertisement streams can be played. Furthermore, when the contents that are recorded by using a recording function of the PVR or DVR are repeatedly played and when a corresponding AD break starts, a plurality of advertisement streams stored in the storage medium 440 are interchanged and are inserted so that different advertisements can be played whenever the same contents may be repeatedly played.

Exemplary embodiments may also include computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks and optical data storage devices, and carrier waves (such as data transmission through the Internet).

Although a few exemplary embodiments have been shown and described, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of inserting second contents stored in a storage medium of a host while first contents input from an external provider are being played, the method comprising:

searching, by a searching unit, for the second contents using location information which indicates a location of the second contents stored in the storage medium;

detecting, by a signal information detecting unit, signaling information from the first contents, the signaling information indicating a section in the first contents in which insertion of the second contents is allowed; and playing, by a playing unit, the searched second contents in the allowed section of the first contents which are being played, based on the signaling information, wherein the location information comprises information on at least one from among a plurality of components included in the second contents which are stored in the storage medium and which indicates a form in which at east two of the plurality of components are selected and combined; and wherein the playing of the searched second contents comprises playing the at least one components designated by the location information.

2. The method of claim 1, wherein the searching for the second contents uses an OpenCable Application Platform (OCAP) digital program insertion (DPI) function and wherein the location information is transferred via the OCAP DPI application program interface (API) to a switch engine of an apparatus performing the searching and the playing of the searched second content.

3. The method of claim 2, wherein the signaling information comprises at least one selected from the group consisting of a DPI signaling descriptor, a DPI trigger, and a DPI timeline.

4. An apparatus for inserting second contents stored in a storage medium of a host while first contents input from an external provider are being played, the apparatus comprising:

a searching unit which searches for the second contents using location information which indicates a location of the second contents stored in the storage medium;

a signaling information detecting unit which detects signaling information from the first contents, the signaling information indicating a section in the first contents in which insertion of the second contents is allowed; and a playing unit which plays the searched second contents in the allowed section of the first contents which are being played, based on the signaling information, wherein the location information comprises information on at least one from among a plurality of components included in the second contents which are stored in the storage medium and which indicates a form hich at least two of the plurality of components are selected and combined, wherein the playing unit plays the at least one components designated by the location information.

5. The apparatus of claim 4, wherein the searching unit searching for the second contents uses an OpenCable Application Platform (OCAP) digital program insertion (DPI) function and wherein the location information is transferred via the OCAP DPI application program interface (API) to a switch engine of an apparatus performing the searching and the playing of the searched second content.

6. The apparatus of claim 5, wherein the signaling information comprises at least one selected from the group consisting of a DPI signaling descriptor, a DPI trigger, and a DPI timeline.

7. A tangible, non-transitory computer readable recording medium storing executable instructions that when executed cause a computer to perform a method of inserting second contents stored in a storage medium of a host while first contents input from an external provider are being played, the method comprising:.

searching, by a searching unit, for the second contents using location information which indicates a location of the second contents stored in the storage medium;

detecting, by a signal information detecting unit, signaling information from the first contents, the signaling information indicating a section in the first contents in which insertion of the second contents is allowed; and playing, by a playing unit, the searched second contents in the allowed section of the first contents which are being played, based on the signaling information, wherein the location information comprises information on at least on one from among a plurality of components included in the second contents which are stored in the storage medium, and which indicates a form in which at least two of the plurality of components are selected and combined, wherein the playing unit plays the at least one components designated by the location information.

8. The method of claim 1, further comprising identifying a protocol of the location information from among a plurality of protocols comprising a file protocol, a platform dependent digital video recorder protocol, and a platform dependent personal video recorder protocol.

9. The method of claim 1, wherein the location information is in the form of an array indicating how said at least two of the plurality of components are arranged and wherein a first of the at least two of the plurality of components is a video component and a second of the at least two of the plurality of components is an audio component.

10. The method of claim 1, wherein the at least two combined components are presented together as one content.

11. The method of claim 1, wherein the first contents are provided by a headend device of a multi system operator (MSO).

* * * * *